United States Patent
Katayama et al.

(10) Patent No.: US 6,256,035 B1
(45) Date of Patent: Jul. 3, 2001

(54) IMAGE PROCESSING METHOD AND APPARATUS

(75) Inventors: Akihiro Katayama, Yokosuka; Shinji Uchiyama, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/931,366

(22) Filed: Sep. 16, 1997

(30) Foreign Application Priority Data

Sep. 20, 1996 (JP) .................................................. 8-249974

(51) Int. Cl.⁷ .................................................. G06T 15/00
(52) U.S. Cl. .............................................. 345/419; 345/426
(58) Field of Search ................................. 345/426, 427, 345/421, 419

(56) References Cited

U.S. PATENT DOCUMENTS

| | | | |
|---|---|---|---|
| 5,805,782 | * | 9/1998 | Foran .................................... 345/426 |
| 5,886,704 | * | 3/1999 | Kang et al. ........................... 345/426 |
| 5,894,309 | * | 4/1999 | Freeman et al. ..................... 345/426 |
| 5,933,146 | * | 8/1999 | Wrigley ................................ 345/426 |

OTHER PUBLICATIONS

Computer Graphics Proceedings, Annual Conference Series, "Light Field Rendering", M. Levoy, et al., pp. 31–42 (1996).
Computer Graphics Proceedings, Annual Conference Series, "The Lumigraph", S. Gortler, et al., pp. 43–54 (1996).
SPIE, vol. 2409, "A Viewpoint Dependent Stereoscopic Display Using Interpolation of Multi–Viewpoint Images", A. Katayama, et al., pp. 11–20 (1995).
International Journal of Computer Vision, "Epipolar–Plane Image Analysis: An Approach To Determining Structure From Motion", pp. 7–55 (1987).
Signal Processing Image Communication, vol. 9, "Intermediate View Synthesis Considering Occluded And Ambiguously Referenced Image Regions", J. McVeigh, et al., pp. 21–28 (1996).

* cited by examiner

Primary Examiner—Mark R. Powell
Assistant Examiner—Huedung X Cao
(74) Attorney, Agent, or Firm—Fitzpatrick, Cella, Harper & Scinto

(57) ABSTRACT

An object put on a rotational table is photographed from a plurality of visual point positions by a camera, a part of an image group inputted by the photographing is projected to a light space, a correspondence relation between a part of the projected image group and the light space is formed, an image at an arbitrary visual point position is generated on the basis of the formed correspondence relation, and the generated image is displayed, so that there is no need to perform an arithmetic operation to convert into the light group for all of the picture elements of the actual photographed images.

17 Claims, 9 Drawing Sheets

IMAGE PROCESSING METHOD AND APPARATUS

BACKGROUND OF THE INVENTION

1. Field of the Invention

The invention relates to image processing method and apparatus and storage medium for forming an image at an arbitrary visual point position by using an image group obtained by photographing an object at different visual point positions.

2. Related Background Art

In case of generating an image at an arbitrary visual point position by using an actual picture image group photographed at a plurality of visual point positions, there is a method whereby data of the actual photographed image group has previously been converted into light space data and the data is sampled from the light space, thereby generating an arbitrary visual point image.

First, a concept of the light space will now be explained. In a three-dimensional space, a light is emitted by a light source or a reflection light of an object. The light crossing a certain point in the three-dimensional space is unconditionally determined by five variables indicative of its position (x, y, z) and direction ($\theta$, $\phi$). When a function showing a light intensity of the light is defined as f, light group data in the three-dimensional space is expressed by $f(x, y, z, \theta, \phi)$. When considering a time change of the light group data, the light group data is expressed by $f(x, y, z, \theta, \phi; t)$ and the light group in the three-dimensional space is described as a six-dimensional space. This space is called a light space. Since the normal two-dimensional image is considered as an image obtained by recording a light group gathering at a single visual point, it is possible to consider that the two-dimensional image is an image obtained by recording two-dimensional data of $f(\theta, \phi)|x=x0, y=y0, z=z0, t=t0$ In this instance, an attention is paid to a light group which passes a plane in the case where Z=z at t=0. The plane is called a reference plane. Now assuming that a horizontal plane (X-Z plane) that is perpendicular to the Y axis is considered and a parallax in the vertical direction is not considered (y=0, $\phi$=0), a real space is as shown in FIG. 11. The light group emitted from the reference plane is described as $f(x, \theta)$ by using two variables of a position x and an angle $\theta$. Therefore, with respect to the light group which passes a certain point (X, Z) in the real space, a relation expressed by the following equation is satisfied.

$$X = x + Z \cdot \tan \theta \quad (1)$$

When a variable such as $u = \tan \theta$ is defined, the equation (1) is as follows.

$$X = x + uZ \quad (2)$$

When the light group observed at a visual point position of (X, Z) is projected to an (x–u) space of the light space, a straight locus is obtained as shown in FIG. 12. If the (x–u) plane of the light space is filled with the straight loci on the basis of the images photographed at many visual point positions, an image at an arbitrary visual point position can be generated by sampling the light space data from the (x–u) plane along the straight line based on the equation (2).

In the prior art, however, an arithmetic operation for converting all picture elements of the photographed image into a light group has been performed. That is, assuming that there are (E) photographed images and the number of picture elements of each image is equal to (m×n), the picture elements are converted into a light group by performing the calculation (E×m×n) times, so that there is a problem such that an amount of calculation is extremely large.

When the light group is projected to the light space so as to keep a resolution of an input image and the light space data is discreted, there is a problem such that an amount of discreted data is enormously large.

Since the discreted light space data includes data in which no value exists (undefined), there is a problem such that even when the light space data is again sampled in order to generate an arbitrary visual point image, a desired image cannot be generated. In order to avoid such a problem, when a picture element whose value is undefined is sampled, a method whereby the nearest data having a value is obtained and such an undefined value is substituted by this data is also considered. When this method is used, however, there is a problem such that it takes a surplus time to generate the arbitrary visual point image.

SUMMARY OF THE INVENTION

The invention is made in consideration of the above problems.

According to the invention, there is provided an image processing method comprising; an image inputting step of inputting an image group photographed at a plurality of visual point positions; a projecting step of projecting a part of the inputted image group to a light space; a correspondence relation forming step of forming a correspondence relation between the projected image and the light space; an image generating step of generating an image at an arbitrary visual point position on the basis of the formed correspondence relation; and an image displaying step of displaying the generated image.

According to the invention, there is provided an image processing apparatus comprising: image input means for inputting an image group photographed at a plurality of visual point positions; projecting means for projecting a part of the inputted image group to a light space; correspondence relation forming means for forming a correspondence relation between the projected image and the light space; image generating means for generating an image at an arbitrary visual point position on the basis of the formed correspondence relation; and image display means for displaying the generated image.

According to the invention, there is provided a storage medium in which a computer program to realize an image processing method characterized by comprising an image inputting step of inputting an image group photographed at a plurality of visual point positions, a projecting step of projecting a part of the inputted image group to a light space, a correspondence relation forming step of forming a correspondence relation between the projected image and the light space, an image generating step of generating an image at an arbitrary visual point position on the basis of the formed correspondence relation, and an image displaying step of displaying the generated image has been stored and which can be read by a computer.

DETAILED DESCRIPTION OF THE PREFERRED EMBODIMENTS (a) First Embodiment

Figure 1:
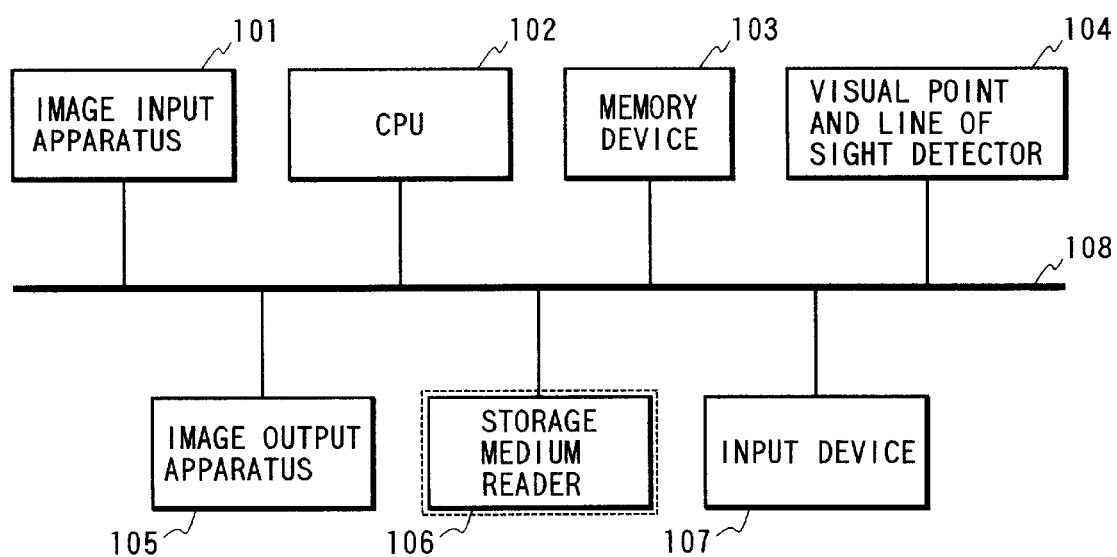
FIG. 1 is a schematic constructional diagram of an image processing apparatus of the first embodiment.

FIG. 1 shows a schematic diagram of an embodiment of an apparatus for generating and displaying an image at an arbitrary visual point position from an actual photographed image group photographed at a plurality of visual point positions.

In the diagram, reference numeral 101 denotes an image input apparatus for photographing an actual photographed image group. In the image input apparatus, a number of images can be photographed by deviating one camera or by setting a plurality of cameras. In place of the image input apparatus 101, a database in which a number of photographed images have previously been stored can be also used. Reference numeral 102 denotes a CPU for performing processes in accordance with a processing procedure stored in a memory device 103; 103 the memory device in which image data of the actual photographed image group, light space data formed from a multi-visual point image, a program showing the processing procedure of the CPU, and the like are stored and a part of which is used as a work memory; and 104 a visual point and line of sight detector for detecting a visual point position and a direction of a line of sight of the observer. As a visual point and line of sight detector, an input device such as keyboard, mouse, or the like can be used or a device such as an HMD (head mount display) having a sensor or the like can be used. Reference numeral 105 denotes an image output apparatus for displaying an image generated in accordance with the visual point position and direction of the line of sight of the observer. As an image output apparatus, a general two-dimensional display such as CRT, liquid crystal, or the like can be used or a three-dimensional display such as lenticular, HMD, or the like can be also used. As for a program, it is sufficient that the program is recorded in a storage medium such as FD (floppy disk), CD-ROM, magnetic tape, or the like and is read out by a storage medium reader 106 and is stored to the memory device 103.

Figure 2:
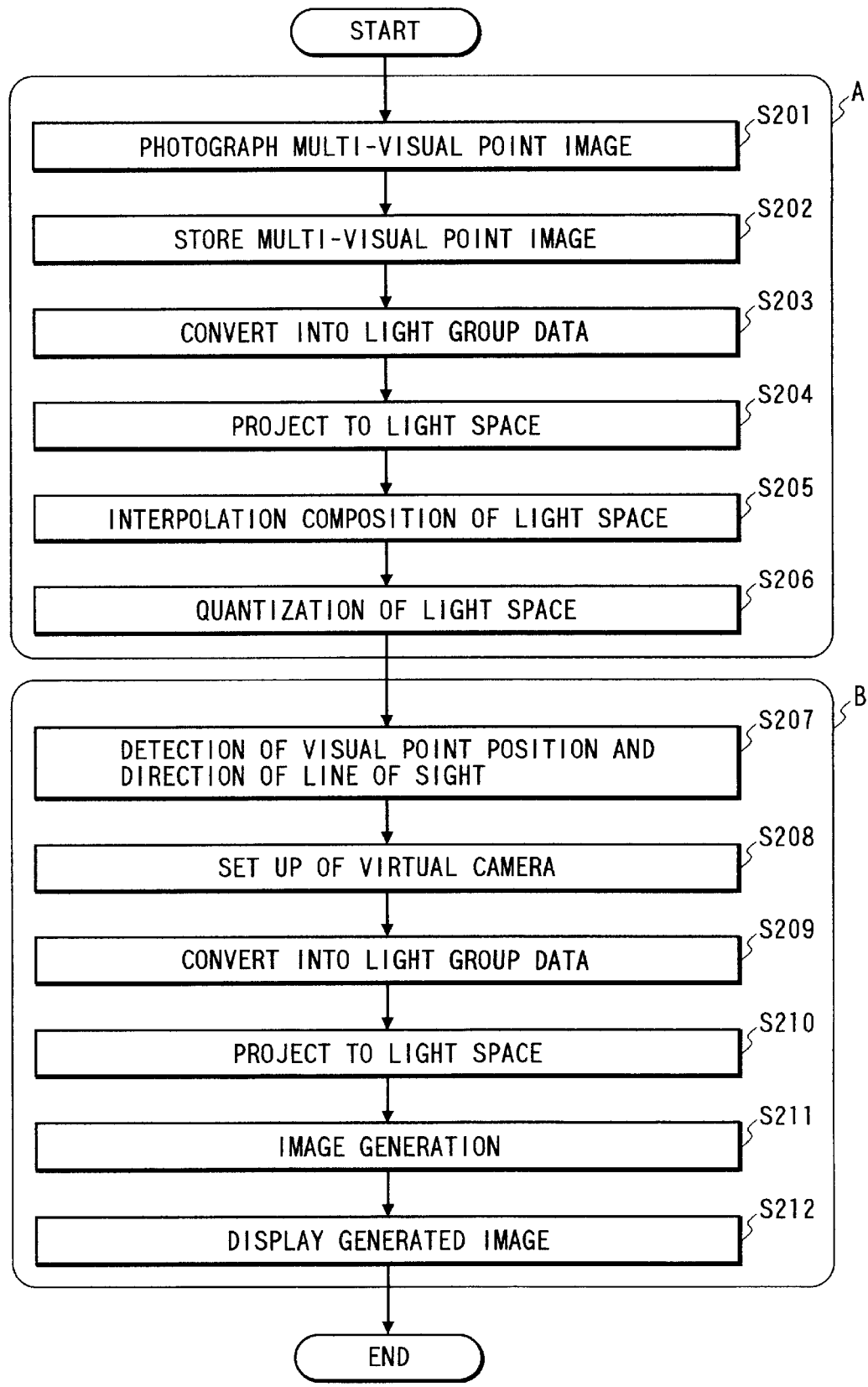
FIG. 2 is a flowchart for processes of the image processing apparatus of the first embodiment.

A method of forming a correspondence relation table between photographed multi-visual point images and the light space data and a method of generating and displaying an image having the given visual point position and direction of the line of sight with reference to the formed correspondence relation table will now be explained with reference to the flowchart of FIG. 2.

The CPU 102 executes processes in accordance with the program stored in the memory device 103. A frame (A) in FIG. 2 denotes a portion in a range from the photographing of multi-visual point images to the formation of a light space and the processes are performed in an off-line manner. A frame (B) in FIG. 2 denotes a portion where the image at an arbitrary visual point position is generated from the light space and is displayed and the processes are performed in an on-line manner.

First, the process for photographing the multi-visual point images and forming the light space will now be described. In step S201, (E) images are photographed at a plurality of visual point positions by using the image input apparatus 101 and are stored into the memory device 103 in step S202. In step S203, the data of one line at the head in each image data stored in the memory device 103 is decomposed into a light group and the light group is projected to the light space in accordance with the equations (1) and (2). The above processes will now be explained with reference to FIG. 3.

Figure 3:
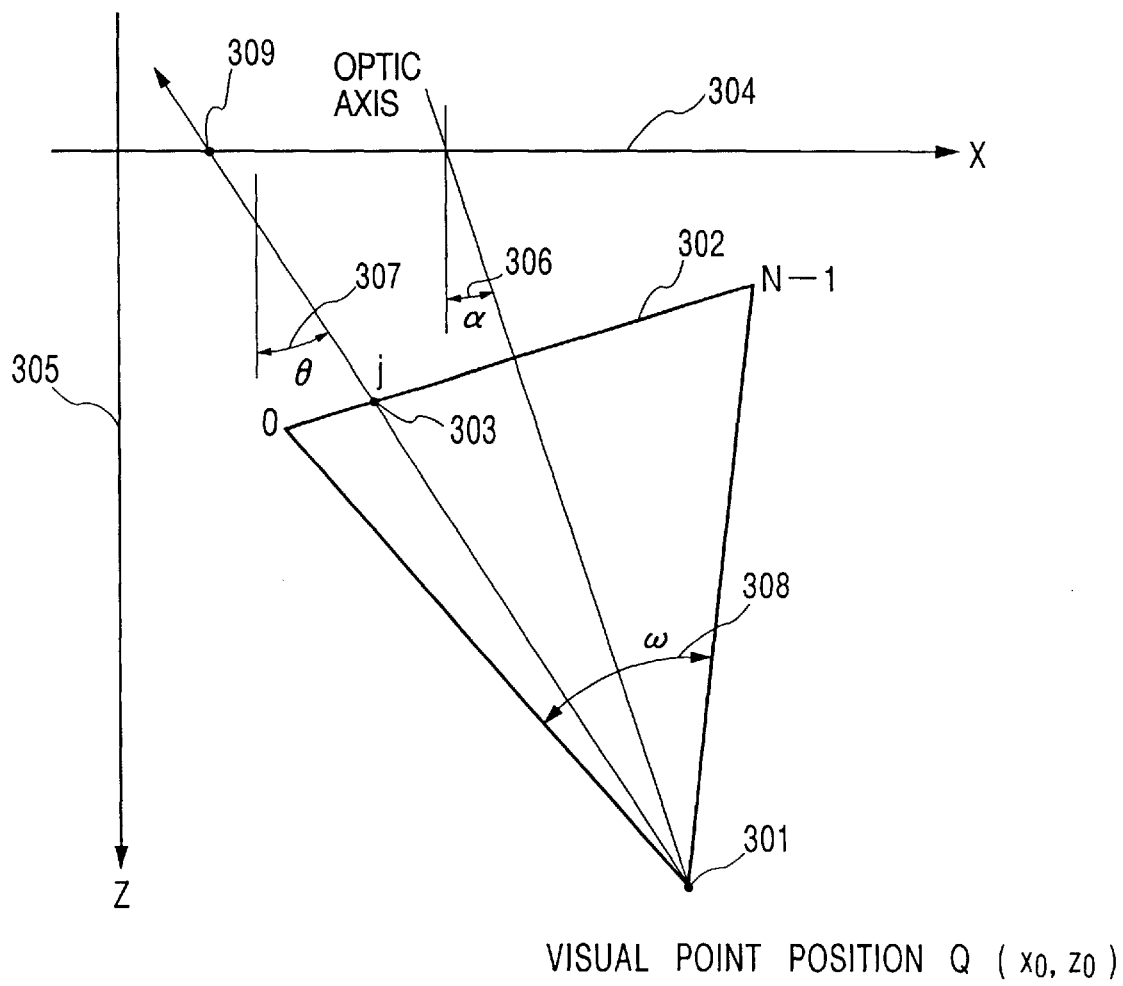
FIG. 3 is a diagram for explaining a process for decomposing an input image to a light group.

FIG. 3 shows a situation in which an image is photographed by setting a camera at a position where a deviation angle of an optic axis for the Z axis is equal to a and the position of the center of lens is equal to Q (x0, z0) (this position is referred to as a visual point position). In the diagram, reference numeral 301 denotes a visual point position Q (x0, z0); 302 a photographed plane; 303 a j-th picture element on an arbitrary line in the photographed plane; 304 an X axis; 305 a Z axis; 306 an angle a formed between the optic axis and the Z axis; 307 an angle θ formed between the Z axis and a light passing the visual point position 301 and picture element 303; 308 an angle ω of view of the camera; and 309 a point at which the light passing the j-th picture element intersects the X axis. Now, assuming that the number of picture elements in each line in the photographed plane is equal to (m), the angle θ 307 can be obtained by solving the following equation.

$$(m/2)\tan(\theta-\alpha)=(j-m/2)\tan(\omega/2) \quad (3)$$

By using the equation (3), the directions of lights of data (as many as (E×m) picture elements) of one line at the head in each image data stored in the memory device 103 are obtained, respectively (step S203). Such a light group is projected to the light space in accordance with the equations (1) and (2) (step S204). As for data that is recorded in the light space, when it is assumed that the light generated from an h-th picture element in the main scanning direction in a k-th image is projected to a position of (x1, u1) in the light space, a value of (k, h) is recorded at this position in the light space. In this instance, as for a reason why only the data of one line at the head in each image data is projected to the light space, as will be understood from the equations (1) and (2), an item of the direction of a height (y) of the image is not included in those equations. Therefore, the data of the second and subsequent lines is also projected to the same position (in the light space) as that of the data of the head line. Accordingly, so long as only the head line in each image is calculated, to which position in the light space the other data is projected can be automatically obtained without calculating. By calculating only the head line as mentioned above, a high processing speed can be realized. In step S205, further, an (x) axis and a (u) axis of the projected light space data are quantized so as to keep a resolution similar to that of the input image. By quantizing in such a manner, a generation of vain data can be suppressed.

Figure 4:
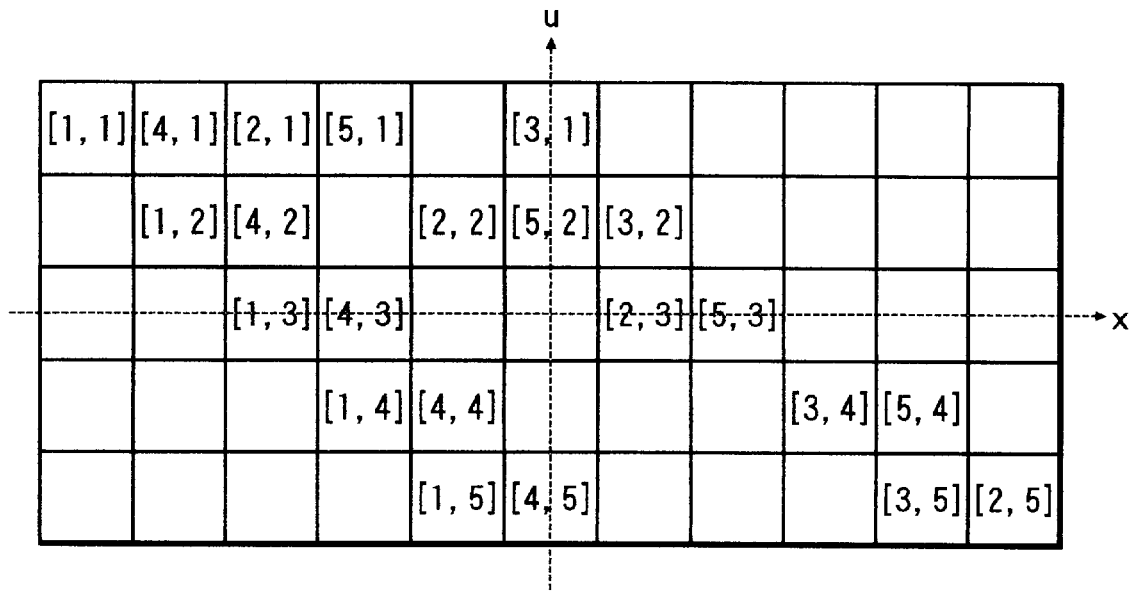
FIG. 4 is a diagram showing an example of light space data quantized at a time point when an interpolation composition of the light space is completed.

FIG. 4 shows an example of quantized light space data at a time point when the processes up to step S205 are finished.

For simplicity of explanation, in this example, the x axis and u axis are quantized and there are (11×5) elements. A set of [image number, picture element number] corresponding to each light is recorded in each element. In this state, since elements whose values are undefined (blank portions in FIG. 4) exist, in step S206, the values of the elements whose values are undefined are presumed. Although a nearest neighbor method is now used as a presuming method, the invention is not limited to this method and they can be also presumed by using any method. The presumed values are recorded in the corresponding element as a set of [image number, picture element number]. By holding the light space data in such a form, a generation of an arbitrary visual point image, which will be explained hereinlater, can be performed with reference to a table (correspondence relation table), so that the process can be executed at a high speed.

A method of generating an image at a desired visual point position by using the correspondence relation table will now be described. First in step S207, a visual point position of an image to be generated, for example, a position, a direction of a line of sight, and the like of the observer are inputted. As means for inputting the position and the direction of the line of sight of the observer, there is a magnetic sensor, a line of sight detector, or the like. However, any means can be used so long as the above object is accomplished. In step S208, a virtual camera is set in the inputted visual point position and direction of the line of sight. In step S209, each picture element of the head line of the virtual camera image is decomposed to a light group. In step S210, to which position in the light space each light of the light group obtained in step S209 is projected is obtained by using the equations (1) and (2). At this time, the data is quantized in a manner similar to the process in step S205. In step S211, an image is generated by reading the element at the position projected in step S210 from the light space. This process will now be described in detail with reference to FIG. 5.

Figure 5:
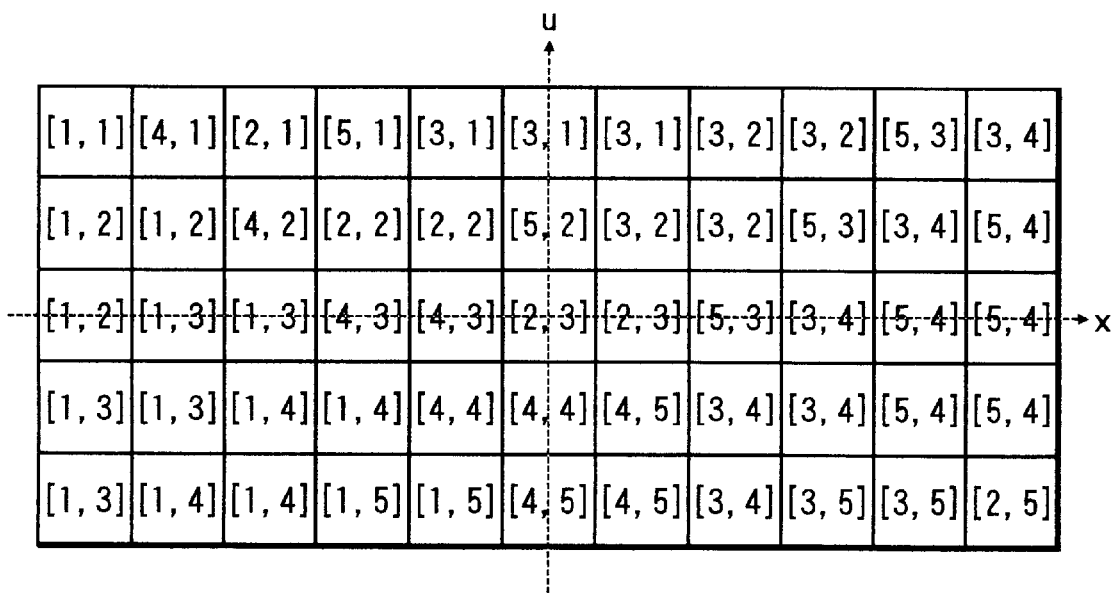
FIG. 5 is a diagram showing a correspondence relation table obtained by projecting the input image to the light space and performing quantizing and interpolating processes.
Figure 6:
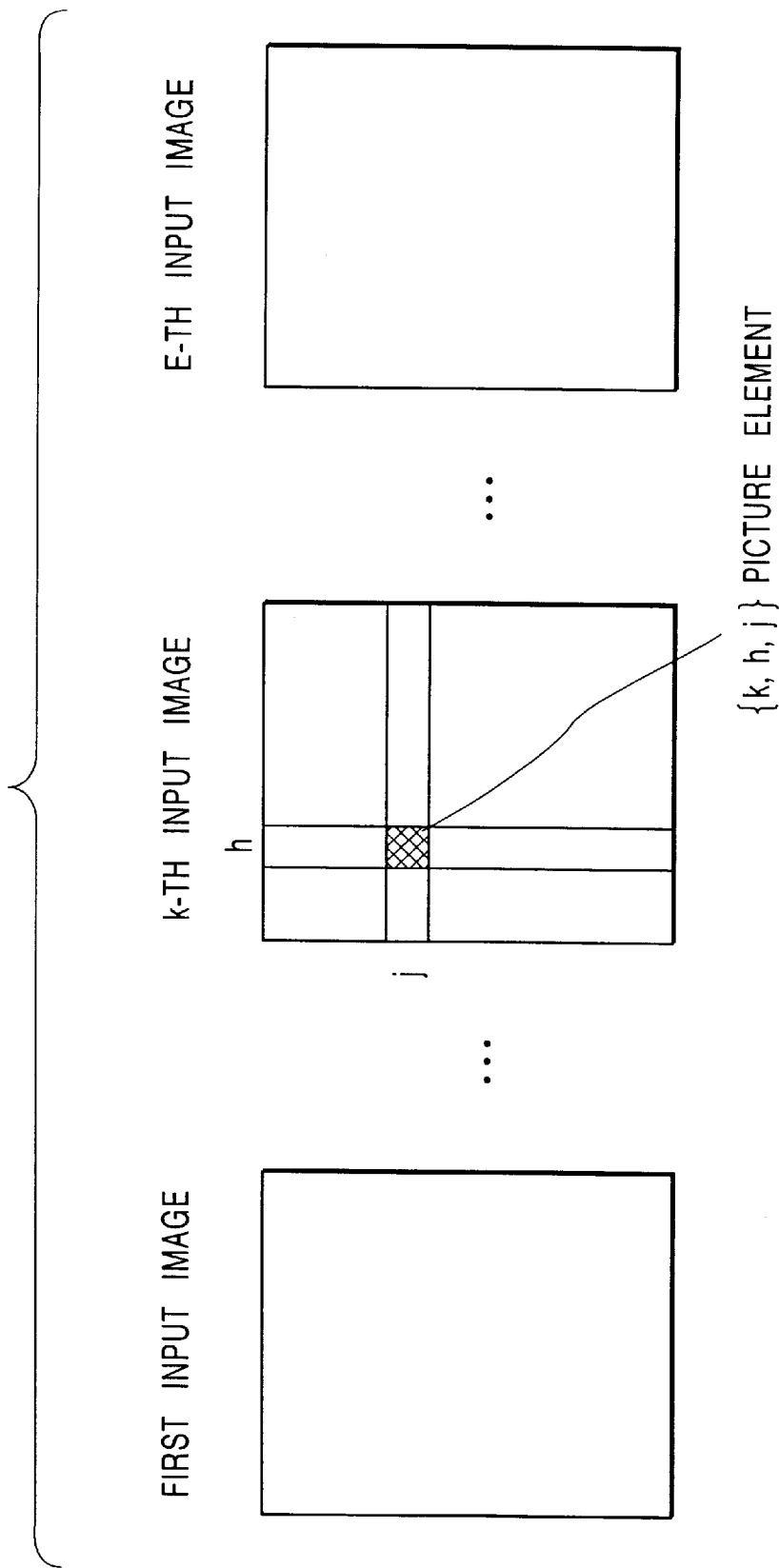
FIG. 6 is a diagram for explaining a position of a picture element described by {k, h, j}.

FIG. 5 is a correspondence relation table obtained by projecting the input image into the light space and performing the quantizing and interpolating processes. Numerical values written in each element are a set of [input image number, picture element number in the main scanning direction]. The positions in the x and u directions of each element are given as shown in the diagram. For instance, the values of element (0, 0) are equal to [2, 3] and the values of element (1, 2) are equal to [3, 2]. In step S210, now assuming that the light beams (five light beams in this case) are projected to the positions of elements (−2, 2), (−1, 1), (0, 0), (1, −1), and (2, −2) in the light space, the values recorded in those elements, namely, [5, 1], [2, 2], [2, 3], [4, 5], and [3, 4] are read out. In step S211, an image is reconstructed by using the read-out values. A picture element existing at the position of the h picture element in the main scanning direction in the k-th image and the j picture element in the sub scanning direction is expressed as {k, h, j} (refer to FIG. 6). In this case, although it seems as if it is sufficient to give the same values as {5, 1, 1} for the (1, 1) picture element of the reconstructed image, {2, 2, 1} for the (2, 1) picture element, . . . , and {3, 4, 1} for the (5, 1) picture element, actually, since a vertical parallax is ignored at the time of the projection to the light space, if the processes are executed as mentioned above, the reconstructed image is largely distorted. A method of correcting such a distortion will now be explained.

Figure 7:
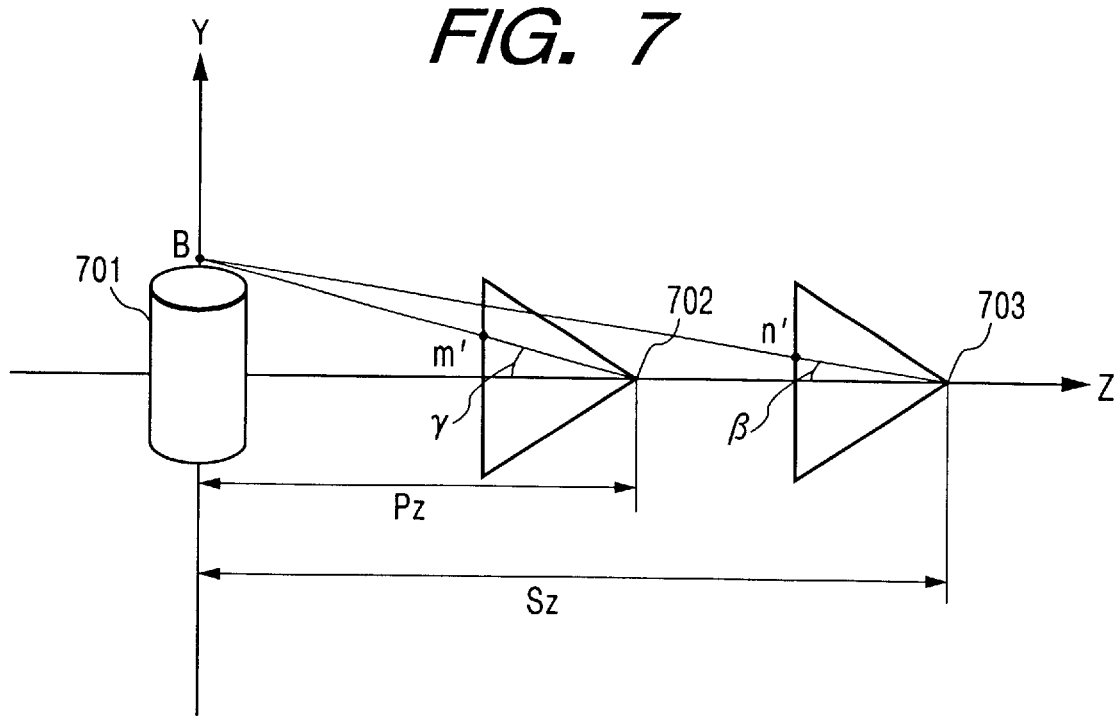
FIG. 7 is a diagram for explaining a correcting process in the Y axial direction.

FIG. 7 is a diagram showing a principle for correcting the distortion of the reconstructed image. In the diagram, reference numeral 701 denotes an object to be photographed; 702 an image at a visual point position P to be reconstructed; and 703 an input image at a visual point position S.

One point B in the object 701 will now be considered. It is now assumed that the point B is close to the Y axis or the z coordinate values of the image 702 at the visual point position P to be reconstructed and the image 703 at the visual point position S are sufficiently large or the z coordinate values of the image 702 at the visual point position P to be reconstructed and the image 703 at the visual point position S are almost the same values. In this instance, the light emitted from the point B is recorded at the m'-th line in the image 702 at the visual point position P to be reconstructed and the n'-th line in the image 703 at the visual point position S. Therefore, the following equations are obtained.

$$Pz \cdot \tan \gamma = Sz \cdot \tan \beta \quad (4)$$

$$\tan \gamma = d \cdot (n/2 - m')/f \quad (5)$$

$$\tan \beta = d \cdot (n/2 - n')/f \quad (6)$$

where, it is assumed that d: picture element pitch of the virtual camera f: focal distance n: the total number of lines Sz: distance between the photographing point of the input image and the reference plane Pz: distance between the position of the reconstructed image and the reference plane From the equations (4), (5), and (6), the following equation (7) is obtained.

$$n' = n/2 + (m' - n/2) \cdot Sz/Pz \quad (7)$$

As mentioned above, the value of the m'-th scan line of the image 702 at the visual point position P to be reconstructed is equal to the value of the n'-th scan line which is given by the equation (7) of the image 703 at the visual point position S. Therefore, it is sufficient to give the same picture element values as {5, 1, R__5__1} for the (1, 1) picture element of the reconstructed image, {2, 2, R__2__1} for the (2, 1) picture element, . . . , and {3, 4, R__3__1} for the (5, 1) picture element. R__i__j denotes a value which is calculated by the equation (7) from the i-th input image position, the reconstructed image position, and the line position to be obtained in the reconstructed image. With respect to the picture elements of the second and subsequent lines of the reconstructed image as well, for example, those values are equal to the values of the picture element which is given by {2, 2, R__2__4} in case of the (2, 4) picture element or {2, 3, R__2__7} in case of the (3, 7) picture element. Therefore, the reconstructed image can be generated by obtaining the picture element values as mentioned above with respect to all of the picture elements. However, when the value of n' which is given by the equation (7) satisfies the relation (n'≦0) or (n'>n), predetermined picture element values are used.

Finally, the generated image is displayed in step S212.

As mentioned above, the position where the input image is projected to the light space is preliminarily calculated and held in a table format (correspondence relation table). When the image at an arbitrary visual point position is generated, desired picture element values are read out from the input image with reference to the correspondence relation table and an image is reconstructed while correcting a distortion, so that an arbitrary visual point image can be generated at a high speed.

(b) Second Embodiment

Although the first embodiment has been described on the assumption that the reference plane is one flat surface, when the number of reference planes is equal to one, since the light direction which can be described is one direction, it is impossible to observe while rounding to the back side of the object (to generate the reconstructed image at the position on the back side). Therefore, an example of solving such a problem by using a plurality of reference planes will now be described hereinbelow.

A construction of an image processing apparatus of the second embodiment is similar to FIG. 1.

Figure 8:
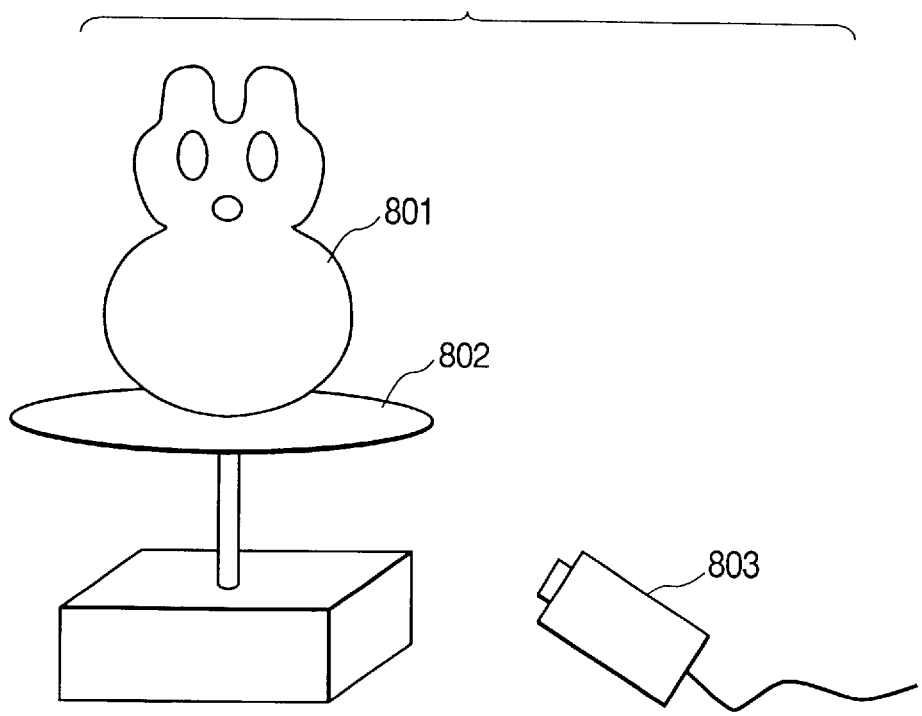
FIG. 8 is a diagram showing a photographing situation.

FIG. 8 is an explanatory diagram of a method of obtaining multi-visual point images in the image input apparatus 101 of the image processing apparatus of the first embodiment. In the diagram, reference numeral 801 denotes an object which is used for photographing; 802 a rotational table which rotates with the object 801 thereon in order to photograph the object 801 from the positions around it; and 803 a CCD camera which is used to photograph the object 801.

The object 801 is put on the rotational table 802 and multi-visual point images are photographed by the CCD camera 803 while rotating the table 802. The multi-visual point images photographed by the CCD camera 803 are stored into the memory device 103.

The operation of the embodiment will now be described. For simplicity of explanation, only a case where the parallax in the y axial direction is omitted will now be described. It will be obviously understood that even when there is a parallax in the y axial direction, the invention can be also similarly extended. An outline of the operation will be first described with reference to FIG. 9.

Figure 9:
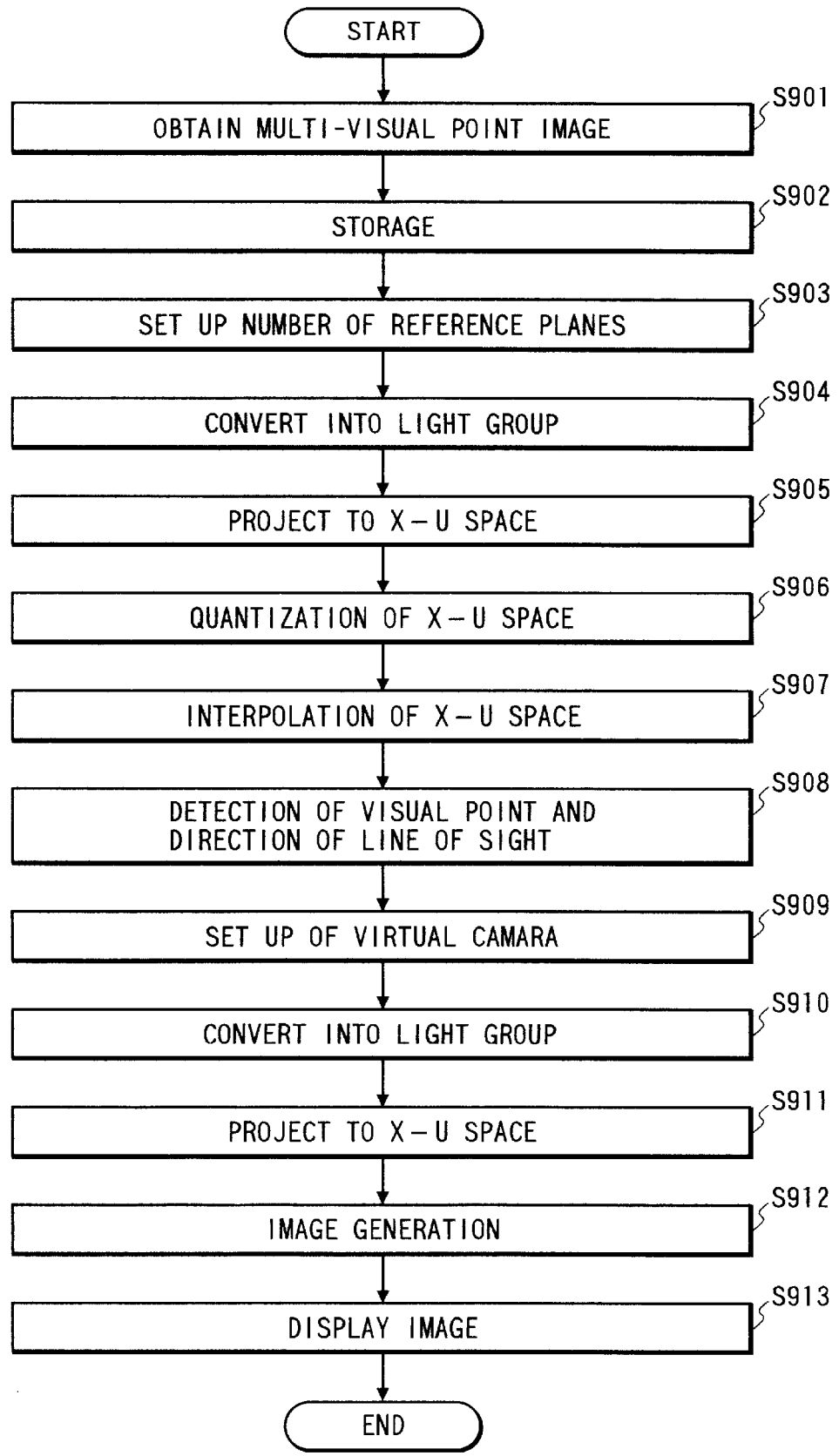
FIG. 9 is a flowchart showing a flow of processes of the second embodiment.

FIG. 9 is a flowchart showing a flow of processes of the image processing apparatus of the second embodiment.

Figure 10:
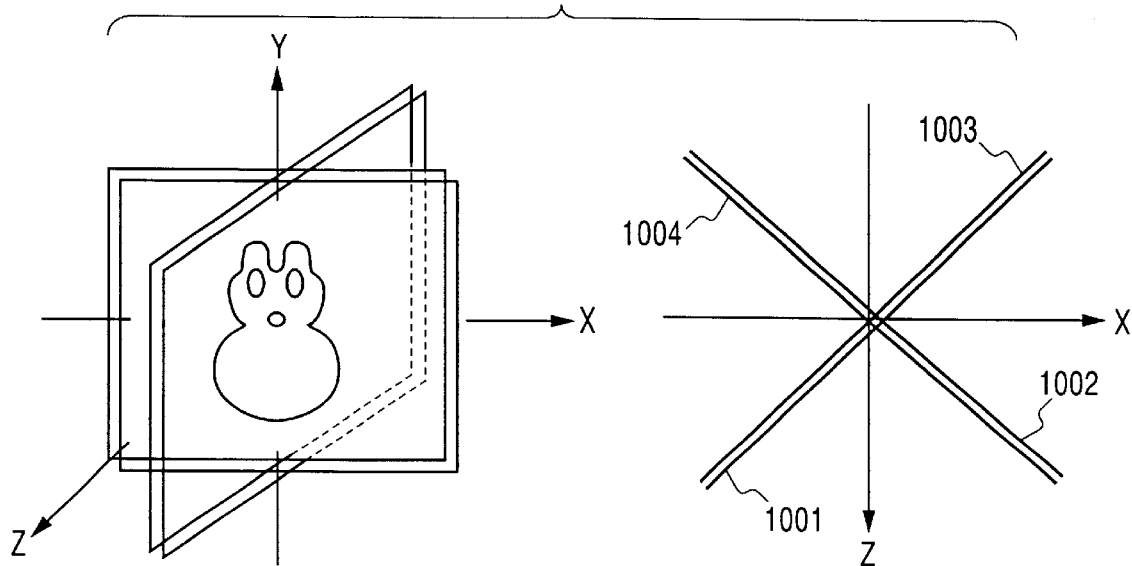
FIG. 10 is an explanatory diagram in case of using four reference planes.
Figure 11:
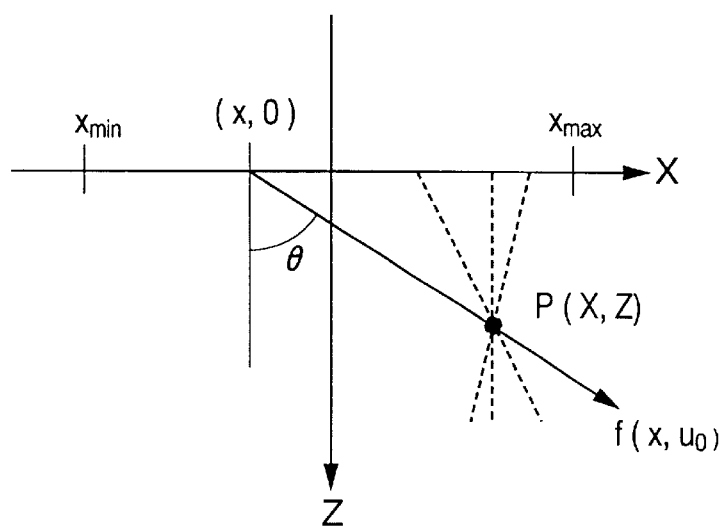
FIG. 11 is a diagram for explaining a light group passing through one point in a real space.
Figure 12:
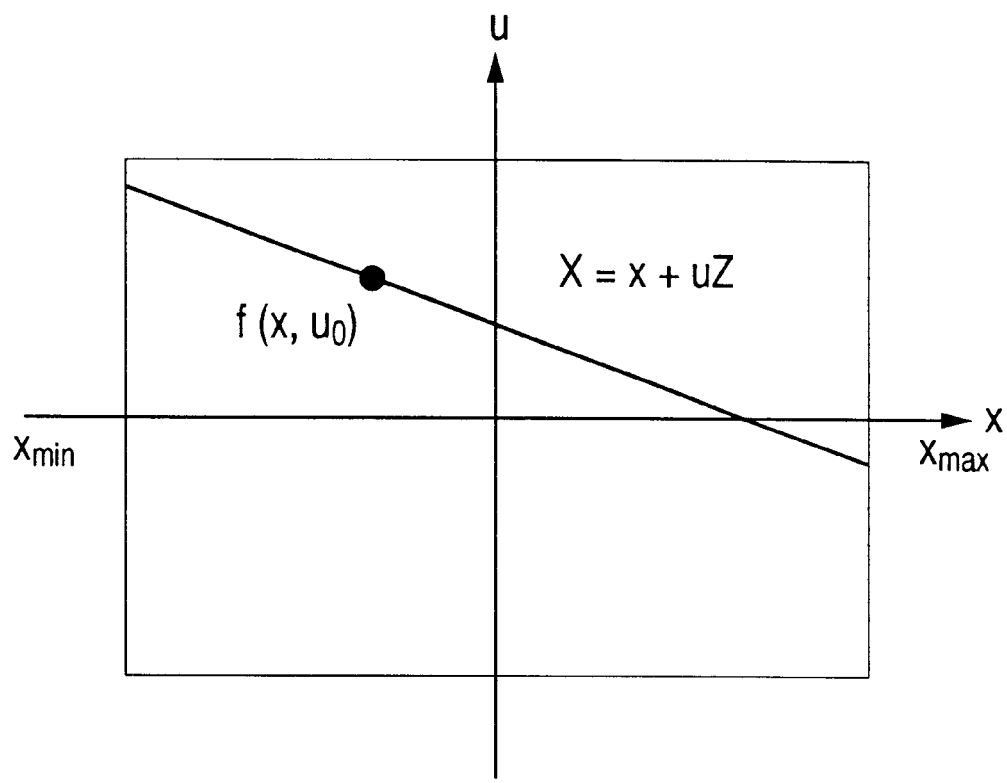
FIG. 12 is a diagram showing a state in which the light group passing one point in the real space is projected onto a straight line in the light space.

First, multi-visual point images are obtained from the image input apparatus 101 in step S901 and are stored in the memory device 103 in step S902. The number of reference planes of the light space and their arrangement are determined in step S903. In this case, predetermined values can be used or a method whereby the operator inputs them from a data input device (not shown) at the time of starting the processes can be also used. When a plane which can be observed is limited, reference planes of the number according to such a limited plane can be also set. The invention is not limited to the above value. In this example, the reference planes are radially arranged so that the u axes of four reference planes are overlapped and the reference planes are deviated every 90° around the u axis as a center. This state is shown in FIG. 10. In the embodiment, although the example of using four reference planes has been shown, the number of reference planes is not limited to four but any number of reference planes can be used. Although the reference planes are arranged at regular intervals of every 90° in this example, it is not always necessary to arrange them at regular intervals.

A case of expressing the light space by using the reference planes which are radially arranged will now be described in detail. A construction such that they are radially arranged denotes that all of the reference planes are crossed on one straight line (rotary axis at the time of photographing the object. In this case, this straight line is set to the Y axis.) passing the object and all of the angles formed by the adjacent reference planes are equal and an angle between one of the reference planes and the Z axis is equal to δ/2 (where, δ denotes an angle between the neighboring reference planes). An angle between each of the reference planes arranged as mentioned above and the light passing the reference plane is examined and the light is recorded in the light space corresponding to the reference plane where such an angle is closest to the right angle. A case of using the four reference planes which are radially arranged will now be described. In FIG. 10, reference numeral 1001 denotes a reference plane 1 corresponding to the light space to record a locus of the light which arrives from the object 801 and whose angle lies within a range of $(0° \leq \phi < 90°)$; 1002 a reference plane 2 corresponding to the light space to record a locus of the light which arrives from the object 801 and whose angle lies within a range of $(90° \leq \phi < 180°)$; 1003 a reference plane 3 corresponding to the light space to record a locus of the light which arrives from the object 801 and whose angle lies within a range of $(180° \leq \phi < 270°)$; and 1004 a reference plane 4 corresponding to the light space to record a locus of the light which arrives from the object 801 and whose angle lies within a range of $(270° \leq \phi < 360°)$.

Subsequently, in step S904, in a manner similar to step S203, the data of one line at the head in each image data stored in the memory device 103 is decomposed to a light group and to which one of the four reference planes each light is recorded is determined by a value in the direction θ of each light derived. At this time, it is determined such that when the angle (direction) θ of the light obtained lies within a range of $(0° \leq \theta < 90°)$, the light is obtained from the reference plane 1001, when $(90° \leq \theta < 180°)$, the light is obtained from the reference plane 1002, when $(180° \leq \theta < 270°)$, the light is obtained from the reference plane 1003, and when $(270° \leq \theta < 360°)$, the light is obtained from the reference plane 1004, respectively. In step S905, [image number, picture element number] of this light is recorded at the position which is given by the equations (1) and (2) on the x–u space corresponding to the reference plane. However, since the equations (1) and (2) are the equations corresponding to the case where the reference plane is set to z=0, the following pre-process is performed.

If the light is derived from the reference plane 1003, the position of the lens center 301 of the camera is rotated by 225° and the direction θ of the light is subtracted by only 225°. Thus, the reference plane 1003 becomes a flat surface of z=0 and the equations (1) and (2) can be applied. In case of the reference planes 1001, 1002, and 1004 as well, by respectively executing the similar processes by only 45°, 135°, and 315°, the equations (1) and (2) can be applied. (Generally, the angle of rotation and the angle to be subtracted are obtained by $(c1+c2)/2$ when $c1 \leq \theta < c2$.)

The above processes are executed to the light passing all of the picture elements of $(0 \leq j < N)$ and image numbers of the multi-visual point images corresponding to the corresponding x–u space and picture element positions (picture element numbers) in the first line of the images are recorded. Further, the above processes are repetitively executed to all of the inputted multi-visual point images. All of the light beams obtained from the inputted multi-visual point images are recorded into the four x–u spaces by the above processes. Now, the processes are performed to only the first line of the multi-visual point images and no process is performed to the remaining lines. This is because in case of omitting the vertical (y direction) parallax, if only the first line is processed, the remaining lines are mapped to the same position in the same x–u space as those in the first line, so long as the processes are performed to the first line in each image, desired data can be also similarly obtained with respect to the other lines.

Further, the light space is quantized in step S906. Undefined picture element values on the light space are presumed in step S907 and presumed results are recorded as a set of [image number, picture element number] to the corresponding element in the light space. Since processes in steps S906 and S907 are similar to the processes performed in the first embodiment, their descriptions are omitted here.

A visual point position and a direction of a line of sight of the observer are subsequently detected in step S908. Although the visual point position of the observer is detected here, an arbitrary position can be also inputted and the invention is not limited to the above method. Now, assuming that the visual point position of the observer is set to (x, z) and the direction of the line of sight is set to α and the angle of view is set to ω, an image which can be seen by the observer is equivalent to an image photographed by a virtual camera in which the position of the lens center of the camera is equal to (x, z) and the optic axial direction is set to α and the angle of view is set to ω. In step S909, the virtual camera is set at the visual point position and in the line of sight direction which were detected. In step S910, each picture element of the head line of the image of the virtual camera is decomposed into a light group. In step S911, at which position in the x–u space the light group is projected is calculated. Calculating equations in this instance are the same as the equations (1) and (2). Thus, since the image number and picture element number recorded at the corresponding positions on the x–u space can be known, the line number is subsequently calculated. A calculation of the line number can be performed in a manner similar to the case of the first embodiment by using the equation (7). When the line number is obtained, since the picture element in the input image group is unconditionally determined, the color of the picture element is given to picture elements of the virtual camera image corresponding to the foregoing light.

By executing the above processes with respect to all of the picture elements of the virtual camera image, in step S912, an image corresponding to the visual point position and the direction of the line of sight of the observer can be generated. In step S913, the image generated in step S912 can be also displayed.

By constructing as mentioned above, even a plane which cannot be expressed by one reference plane can be also expressed. By using a plurality of reference planes, an angle between each reference plane and the light passing there is close to the right angle. Therefore, the plane of the x–u space corresponding to each reference plane decreases, so that there is an advantage such that an amount of data to be preserved is reduced.

As a visual point and line of sight detector 104, any apparatus can be used so long as it can detect the visual point position and the direction of the line of sight. A stereoscopic display unit such as a lenticular system, glasses system, or the like which can stereoscopically observe with both eyes is used and the images corresponding to the positions of the right and left eyes of the observers are generated in step S211 or S912, so that a both-eye stereoscopic display apparatus which can cope with the movement of the visual point of the observer is derived.

According to the embodiment as described in detail above, since there is no need to perform an arithmetic operation to convert into the light groups for all of the picture elements of the actual photographed images, there is an advantage such that a calculation amount is small.

As for an element whose value doesn't exist (undefined) in the discreted light space, since a value is determined by preliminarily executing the interpolating process, there is advantages such that a calculating process when an arbitrary visual point image is generated (during the operation) is reduced and the image generation and display can be performed at a high speed.

The invention can be applied to a system comprising a plurality of equipment or can be also applied to an apparatus comprising one equipment. It will be obviously understood that the invention is applied to a case where it is embodied by supplying a program to a system or an apparatus. In this case, the program is stored into a storage medium that is installed in the system or apparatus and the program is read out from the storage medium to the system or apparatus, so that the system or apparatus operates in accordance with a predetermined method.

What is claimed is:

1. An image processing method comprising:

an image inputting step of inputting an image group photographed at a plurality of visual point positions;

a projecting step of projecting a part of the inputted image group but not the whole image group to a light space which is defined by at least a position and a direction of an incident light on an image;

a correspondence relation forming step of forming a correspondence relation between the projected image part and the light space;

an image generating step of generating an image at an arbitrary visual point position on the basis of the correspondence relation; and an image displaying step of displaying the generated image.

2. A method according to claim 1, wherein in said image inputting step, images are photographed from a whole circumferential direction of an object while rotating the object on a rotational table.

3. A method according to claim 1, wherein in said projecting step, as a part of the inputted image group, one line at the head in each image in the inputted image group is projected to the light space on a basis of a predetermined relational equation.

4. A method according to claim 1, wherein said image generating step has a correcting step of correcting a distortion of the generated image by correcting a vertical parallax between the arbitrary visual point position and a visual point position of the inputted image group.

5. A method according to claim 4, wherein in said correcting step, the vertical parallax of both visual point positions is corrected by using scan lines from both visual point positions.

6. A method according to claim 1, further comprising:

a setting step of setting a plurality of reference planes; and an expressing step of expressing the light space on the basis of the plurality of set reference planes.

7. A method according to claim 6, wherein in said expressing step, for the reference plane in which an angle between the reference plane and a light passing a picture element is closest to a right angle, the light space is quantized by recording the passing light.

8. A method according to claim 1, wherein the arbitrary visual point position is obtained by a position sensor.

9. An image processing apparatus comprising:

image input means for inputting an image group photographed at a plurality of visual positions;

projecting means for projecting a part of the inputted image group but not the whole image group to a light space which is defined by at least a position and a direction of an incident light of an image;

correspondence relation forming means for forming a correspondence relation between the projected image part and the light space;

image generating means for generating an image at an arbitrary visual point position on the basis of the correspondence relation; and image display means for displaying the generated image.

10. An apparatus according to claim 9, wherein said image inputting means photographs images from a whole circumferential direction of an object while rotating the object on a rotational table.

11. An apparatus according to claim 9, wherein as a part of the inputted image group, said projecting means projects one line at the head in each image in the inputted image group to the light space on a basis of a predetermined relational equation.

12. An apparatus according to claim 9, wherein said image generating means has correcting means for correcting a distortion of the generated image by correcting a vertical parallax between the arbitrary visual point position and a visual point position of the inputted image group.

13. An apparatus according to claim 12, wherein said correcting means corrects the vertical parallax of both visual point positions by using scan lines from both visual point positions.

14. An apparatus according to claim 9, further comprising:
   setting means for setting a plurality of reference planes; and
   expressing means for expressing the light space on the basis of the plurality of set references planes.

15. An apparatus according to claim 14, wherein for the reference plane in which an angle between the reference plane and a light passing a picture element is closest to a right angle, said expressing means records the passing light, thereby quantizing the light space.

16. An apparatus according to claim 9, wherein the arbitrary visual point position is obtained by a position sensor.

17. A computer-readable storage medium storing a computer program for instructing a computer to perform an image processing method comprising:
   an image inputting step of inputting an image group photographed at a plurality of visual point positions;
   a projecting step of projecting a part of the inputted image group but not the whole image group to a light space which is defined by at least a position and a direction of an incident light of an image;
   a correspondence relation forming step of forming a correspondence relation between the projected image part and the light space;
   an image generating step of generating an image at an arbitrary visual point position on the basis of the correspondence relation; and
   an image displaying step of displaying the generated image, and which generated image displayed can be read by a computer.

* * * * *

UNITED STATES PATENT AND TRADEMARK OFFICE
CERTIFICATE OF CORRECTION

PATENT NO.   : 6,256,035 B1
DATED        : July 3, 2001
INVENTOR(S)  : Akihiro Katayama et al.

It is certified that error appears in the above-identified patent and that said Letters Patent is hereby corrected as shown below:

Drawings,
Sheet 7,
Figure 9, in S909, "CAMARA" should read -- CAMERA --.

Column 2,
Line 27, "comprising;" should read -- comprising: --.

Column 6,
Line 27-28, "image and the reference plane From the equations (4),
(5), and (6), the following equation (7) is obtained."
should read -- image and the reference plane
From the equations (4), (5), and (6), the following equation (7) is obtained --.

Signed and Sealed this

Fifth Day of March, 2002

Attest:

Attesting Officer

JAMES E. ROGAN
*Director of the United States Patent and Trademark Office*